US00RE46661E

(19) United States
(12) Reissued Patent
Sorensen

(10) Patent Number: US RE46,661 E
(45) Date of Reissued Patent: Jan. 9, 2018

(54) ANCHOR FOR CENTER IRRIGATION PIVOT

(71) Applicant: Michael J. Sorensen, Grand Island, NE (US)

(72) Inventor: Michael J. Sorensen, Grand Island, NE (US)

(21) Appl. No.: 15/176,378

(22) Filed: Jun. 8, 2016

Related U.S. Patent Documents

Reissue of:
(64) Patent No.: 9,149,012
Issued: Oct. 6, 2015
Appl. No.: 14/085,492
Filed: Nov. 20, 2013

U.S. Applications:
(60) Provisional application No. 61/728,434, filed on Nov. 20, 2012.

(51) Int. Cl.
*A01G 25/09* (2006.01)
*A45D 2/00* (2006.01)
*A45D 1/04* (2006.01)
*A45D 1/00* (2006.01)

(52) U.S. Cl.
CPC ..... *A45D 2/00* (2013.01); *A45D 1/04* (2013.01); *A45D 2/001* (2013.01); *A45D 2001/008* (2013.01)

(58) Field of Classification Search
CPC .... E02D 5/801; E04H 12/2223; A01G 25/092
USPC ..... 52/157; 405/36, 229, 230; 173/185
See application file for complete search history.

(56) References Cited

U.S. PATENT DOCUMENTS

| | | | | |
|---|---|---|---|---|
| 2,569,528 | A * | 10/1951 | Kandle | 403/300 |
| 3,828,491 | A * | 8/1974 | Koon et al. | 52/23 |
| 4,586,856 | A * | 5/1986 | Waber | 408/92 |
| 4,702,047 | A * | 10/1987 | Stokes | E02D 5/80 114/294 |
| 6,082,157 | A * | 7/2000 | Boyce | 70/58 |
| 6,082,697 | A * | 7/2000 | Grunfeld | A63B 63/004 248/156 |
| 6,742,747 | B1 * | 6/2004 | Timmons, Jr. | 248/139 |
| 7,178,615 | B1 * | 2/2007 | Smollock et al. | 180/19.1 |
| 7,438,243 | B1 | 10/2008 | Erickson | A01G 25/092 239/723 |
| 7,717,195 | B2 * | 5/2010 | Paskar | 175/170 |
| 7,743,852 | B2 * | 6/2010 | Paskar | 175/121 |
| 2014/0238747 | A1 * | 8/2014 | Fabian | 175/57 |

* cited by examiner

*Primary Examiner* — Beverly M Flanagan
(74) *Attorney, Agent, or Firm* — Advent, LLP

(57) ABSTRACT

An anchoring apparatus for an irrigation system is disclosed. The anchoring apparatus includes a support base for securing to an axle of a support tower of the irrigation system. A threaded sleeve is secured to the support base and holds a shaft. The shaft has a threaded portion and an anchor portion. A motor secured to the support base is configured to rotate the shaft in a first direction about a longitudinal axis of the shaft to move the shaft along the longitudinal axis towards an anchoring position to secure and protect the system against wind and severe weather. The motor is also configured to rotate the shaft in a second direction about the longitudinal axis of the shaft to move the shaft along the longitudinal axis towards a disengaging position to lift the anchor portion of the shaft off of the ground.

20 Claims, 6 Drawing Sheets

ANCHOR FOR CENTER IRRIGATION PIVOT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The present application claims the benefit under 35 U.S.C. §119 of U.S. Provisional Application No. 61/728,434, filed on Nov. 20, 2012. Said U.S. Provisional Patent Application No. 61/728,434 is hereby incorporated by reference in its entirety.

TECHNICAL FIELD

The present disclosure generally relates to the field of irrigation, and more particularly to an anchor for a center irrigation pivot.

BACKGROUND

Center pivot irrigation systems are a very common way to keep crops irrigated and maintained. These systems have allowed for farming and food production in areas that would not be possible if not for these irrigation systems. In a center pivot irrigation system, the system includes several sections of irrigation pipe joined together and braced by trusses. These are mounted on wheeled towers with sprinklers situated along its length. The machine then rotates in a circular motion and disperses water on the plants as it moves. These systems are very costly and are a substantial investment for the farmers who use them. One issue with these systems is the damage they can face as a result of high winds and severe weather. Because the systems are linked together, many times the entire system may be blown over and damaged in a wind storm.

SUMMARY

In order to prevent damage to expensive center pivot irrigation systems, a stabilization system is needed to secure and protect the system against wind and severe weather. The present disclosure is directed to an anchoring unit designed for center pivot irrigation systems, holding the system in place and protecting it from being blown over in high winds.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the present invention may be better understood by those skilled in the art by reference to the accompanying figures in which.

DETAILED DESCRIPTION

Figure 1:
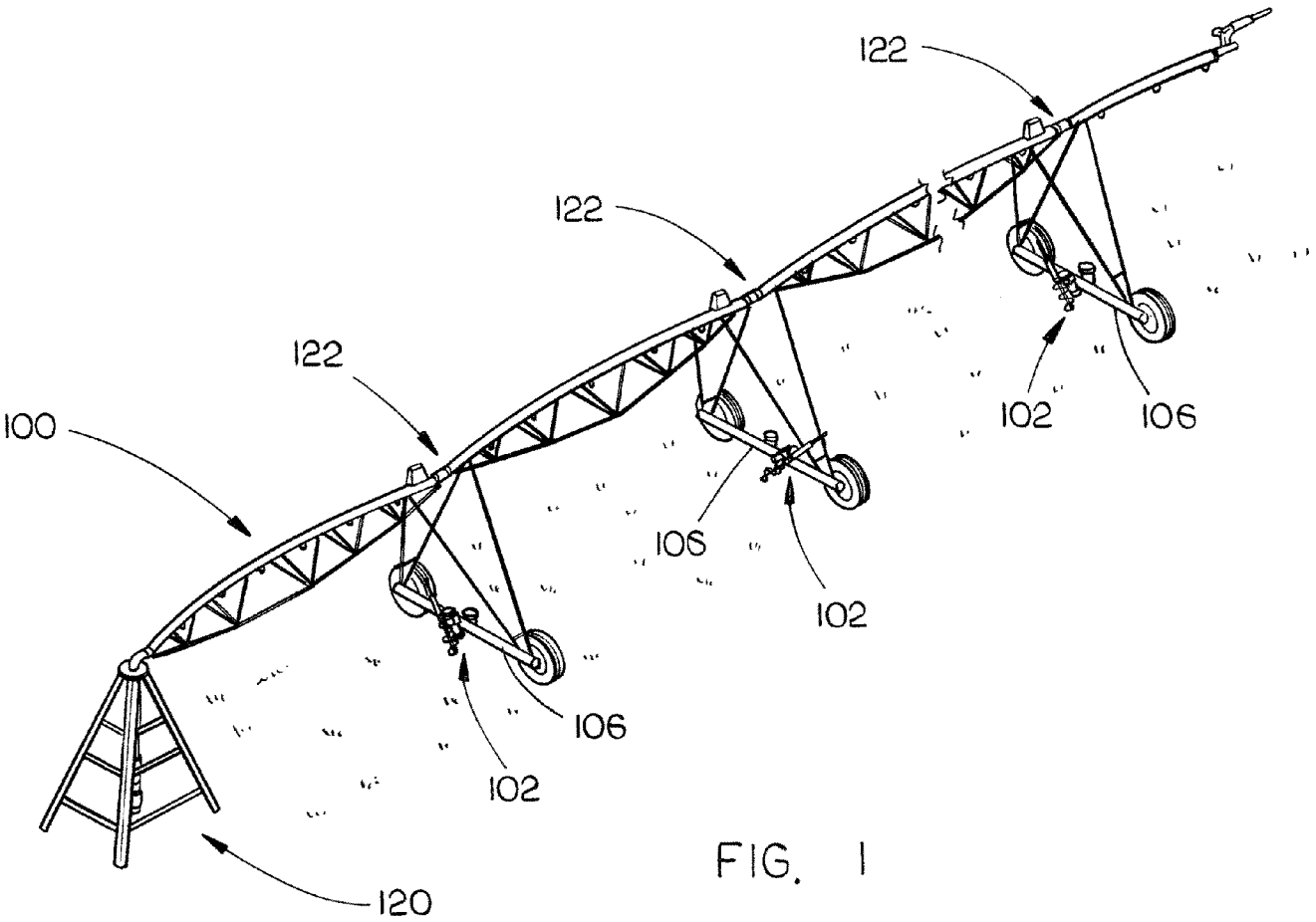
FIG. 1 is an isometric view depicting a center pivot irrigation system utilizing anchoring units.
Figure 2:
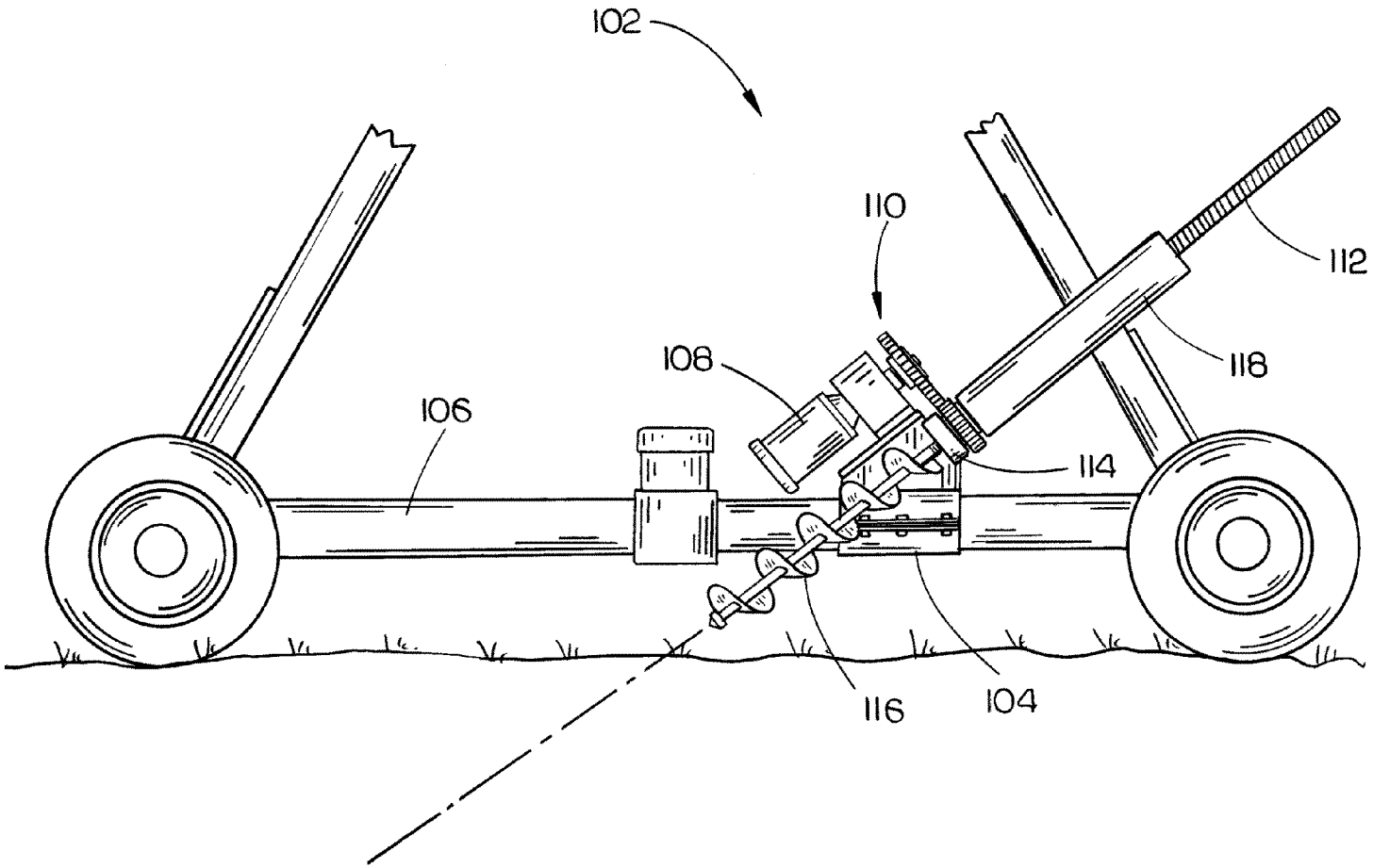
FIG. 2 is a side elevation view depicting an anchoring unit positioned on a pivot axle.
Figure 3:
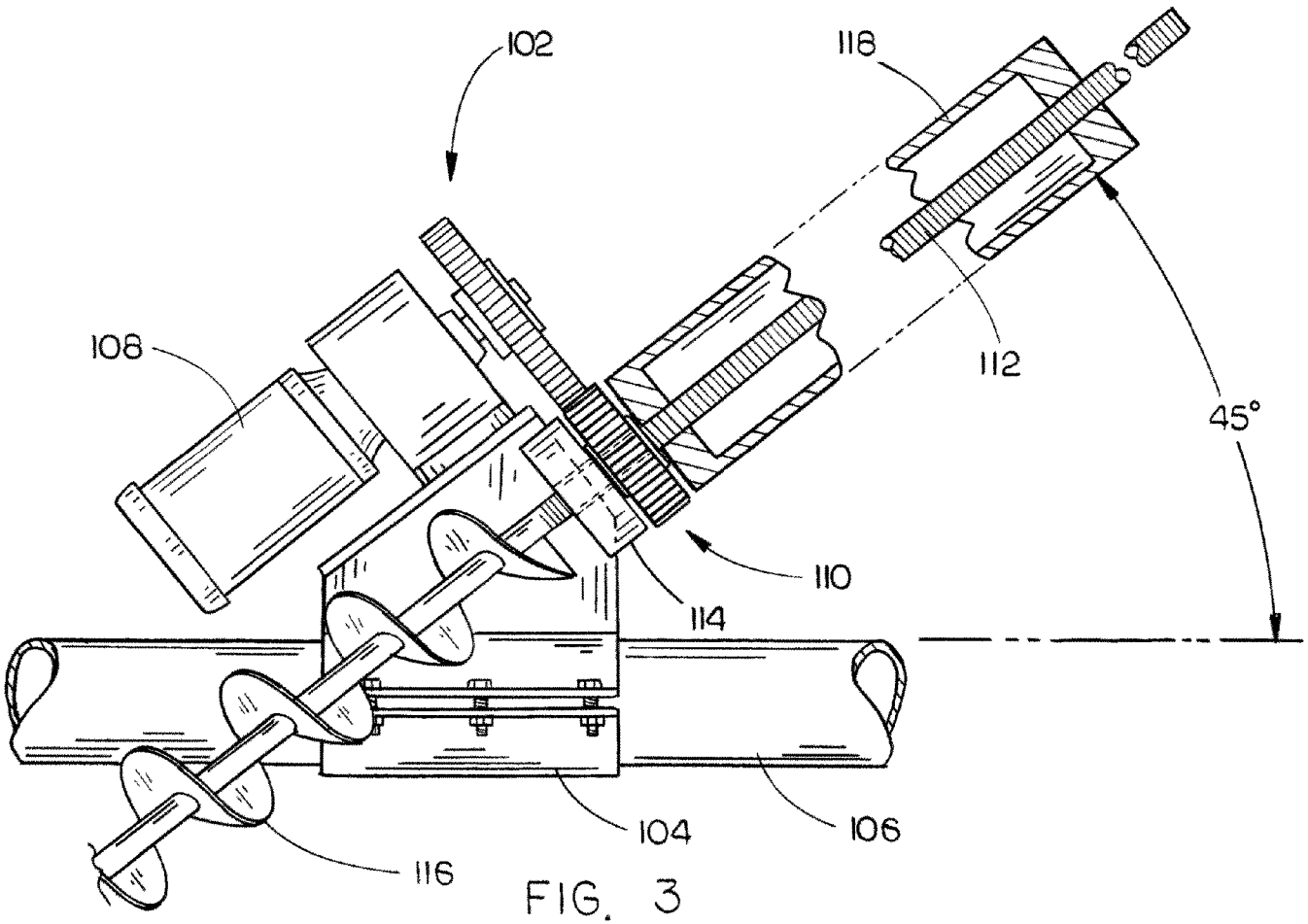
FIG. 3 is a partial cross-sectional view depicting the threaded sleeve and shaft housing of the anchoring unit of FIG. 2.
Figure 4:
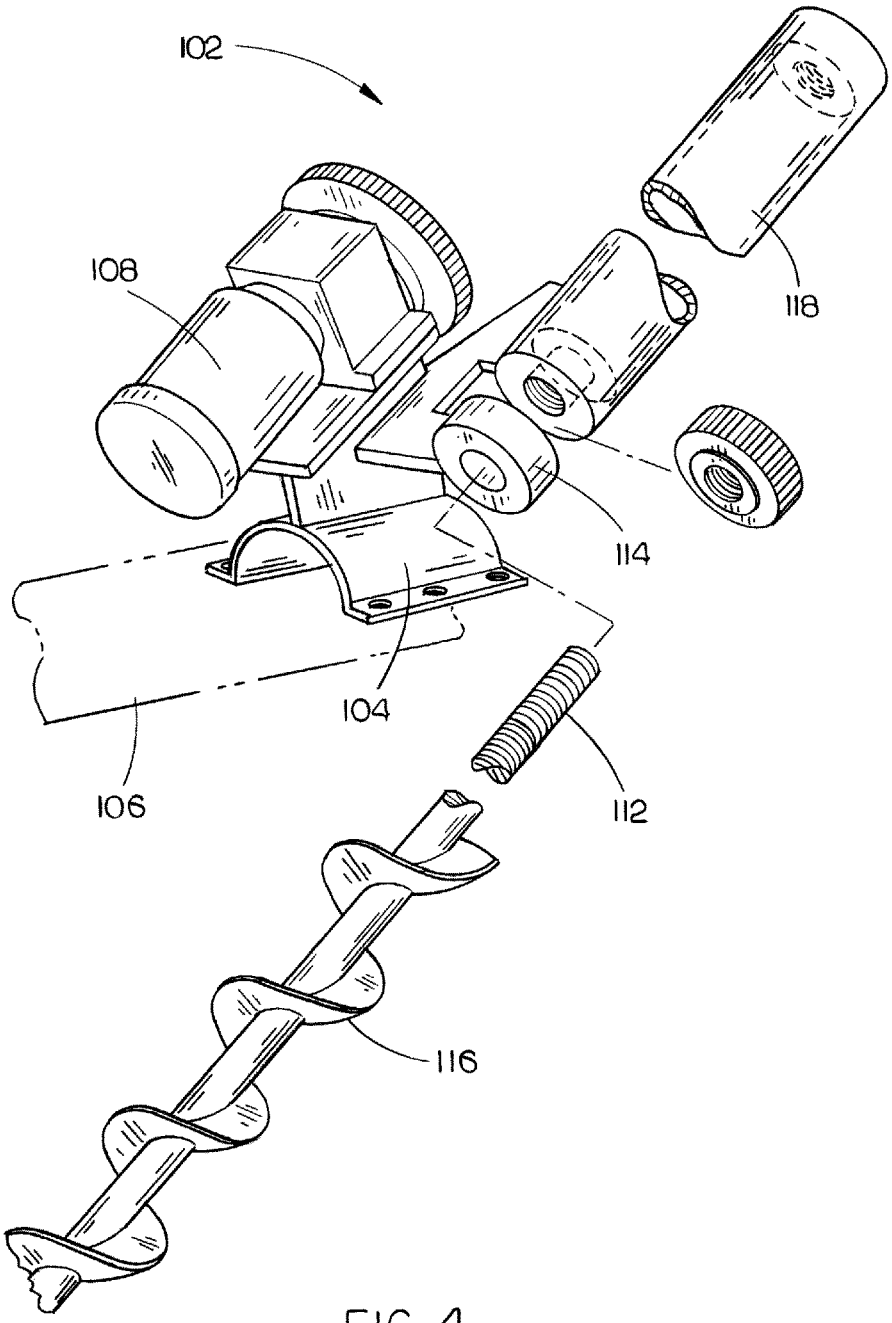
FIG. 4 is an exploded view depicting the anchoring unit of FIG. 2.

Reference will now be made in detail to the subject matter disclosed, which is illustrated in the accompanying drawings.

Referring to FIGS. 1-6, the present disclosure is directed to securing a central pivot irrigation system 100 in place during events of high wind using one or more anchoring units 102. The anchoring unit 102 of the present disclosure may include a support base 104 that secures the anchoring unit 102 to a pivot axle 106 of the irrigation system. Such a support base 104 may be configured as a clamp, a sleeve or the like. In one embodiment, the support base 104 forms a sleeve bolted around the axle 106 wherein the sleeve is approximately 36 inches (~0.9 meters) long in the direction along the axle 106.

The anchoring unit 102 also includes an anchor motor 108, such as a 480 volt motor, secured (e.g., bolted or welded) to the support base 104. The anchor motor 108 drives a gear box 110 that turns a shaft 112. In one embodiment, the gear box 110 includes a gear mounted directly on the drive shaft of the motor 108 and engages a second gear having internal threads in order to turn the shaft 112. It is understood, however, that such a gear box is merely exemplary, and a transmission device that uses one or more gears, chains, belts or the like to transmit rotation from the anchor motor 108 to the shaft 112 may be utilized without departing from the spirit and scope of the present disclosure.

As shown in the figures, the shaft 112 has a threaded portion that is partially enclosed within a threaded sleeve 114 and an anchor portion 116 for anchoring into the ground. The threaded sleeve 114 is secured to the support base 104 and is utilized to hold the shaft 112 against rocking and high winds. This is done so not to put pressure directly on the gear box 110.

In one embodiment, the threaded portion of the shaft 112 is at least approximately 6 feet (~1.8 meters) long and approximately 1 inch (~0.025 meters) around. The anchor portion 116 of the shaft includes an auger long enough to drill at least 3 feet (~0.9 meters) into the ground. Furthermore, the diameter of the auger utilized may range between 10 inches (~0.2 meters) and 15 inches (~0.4 meters) to provide enough holding power. It is contemplated, however, that the lengths and sizes of the threaded portion of the shaft and the anchor portion of the shaft may vary base on various factors such as expected wind intensity and soil composition in the region, material cost, space availabilities or the like. It is also contemplated that the length of the threaded sleeve 114 may be configured based on such factors without departing from the spirit and scope of the present disclosure.

The anchoring unit 102 may further include a shaft housing 118 to at least partially enclose a section of the threaded portion of the shaft 112. The shaft housing 118 may be threaded on each end and may secure the shaft 112 in order to provide additional support to the shaft 112 and relieve some pressure on the gear box 110. It is contemplated that the shaft housing 118 may be configured to be long enough to enclose the entire threaded portion of the shaft 112 even when the anchor portion 116 is not drilled into the ground. However, it is contemplated that the length of the shaft housing 118 may vary without departing from the spirit and scope of the present disclosure.

It is also contemplated that the anchoring unit 102 may further include a micro switch electronically coupled to the anchor motor 108. The micro switch may be configured to stop the shaft 112 from running all the way down or all the way up. For example, two tabs may be positioned on the shaft 112 to indicate two ends of the movable range supported by the shaft 112. When either tabs come into contact with the switch, the tab will trip the micro switch to stop the anchor motor 108 to ensure that the shaft 112 will not be turned beyond the movable range (e.g., being twisted out of the sleeve).

In one embodiment, an anchoring unit 102 is disposed at each tower 122 of the irrigation system. The shaft, the anchor motor, and the housing of the anchoring unit 102 are all enclosed to be water tight. Grease zerks are also in place in the gear box and the sleeves. In addition, the anchoring unit 102 is positioned to avoid interfering with the operation of the axle motor (the motor located on each tower that is used to drive the irrigation system).

It is contemplated that the power for the anchor motor 108 may be supplied from various sources. For example, the electric power delivered to the axle motor mounted at each tower can be shared with the anchor motor 108 located on that tower. In one embodiment, 480 volt anchor motors are used since typical center pivot irrigation systems are powered by 480 volt electricity. It is contemplated, however, that motors powered by different voltage levels may also be utilized. Additionally/alternatively, the anchor motors may be powered by batteries, solar power and/or other power sources without departing from the spirit and scope of the present disclosure.

Furthermore, the anchor motors 108 may be controlled utilizing a control panel in communication with the anchor motors. This control panel may be located at the hub 120 of the center pivot irrigation system 100, or it may be remotely located and may communicate with the anchor motors via various wired or wireless communication means. It is contemplated that the control panel may control the anchor motors 108 simultaneously, sequentially or individually. For instance, the control panel may activate all anchor motors 108 simultaneously to drill or reverse. Alternatively, the control panel may activate the anchor motors 108 sequentially one after another. In addition, the control panel may activate a particular anchor motor on a particular tower individually if needed.

When an anchor motor 108 is activated, the anchor motor 108 may rotate the shaft in one of two directions depending on the control signal it receives. For instance, upon receiving an anchoring command, the anchor motor 108 should rotate the shaft 112 in a first direction about the longitudinal axis of the shaft 112 and move the shaft 112 along its longitudinal axis towards an anchoring position, wherein at least a part of the anchor portion (auger) 116 of the shaft 112 is drilled into the ground. On the other hand, upon receiving a disengaging command, the anchor motor 108 should rotate the shaft 112 in a second direction about the longitudinal axis of the shaft and move the shaft 112 along its longitudinal axis towards a disengaging position, wherein the anchor portion (auger) 116 of the shaft 112 is lifted off of the ground.

Figure 5:
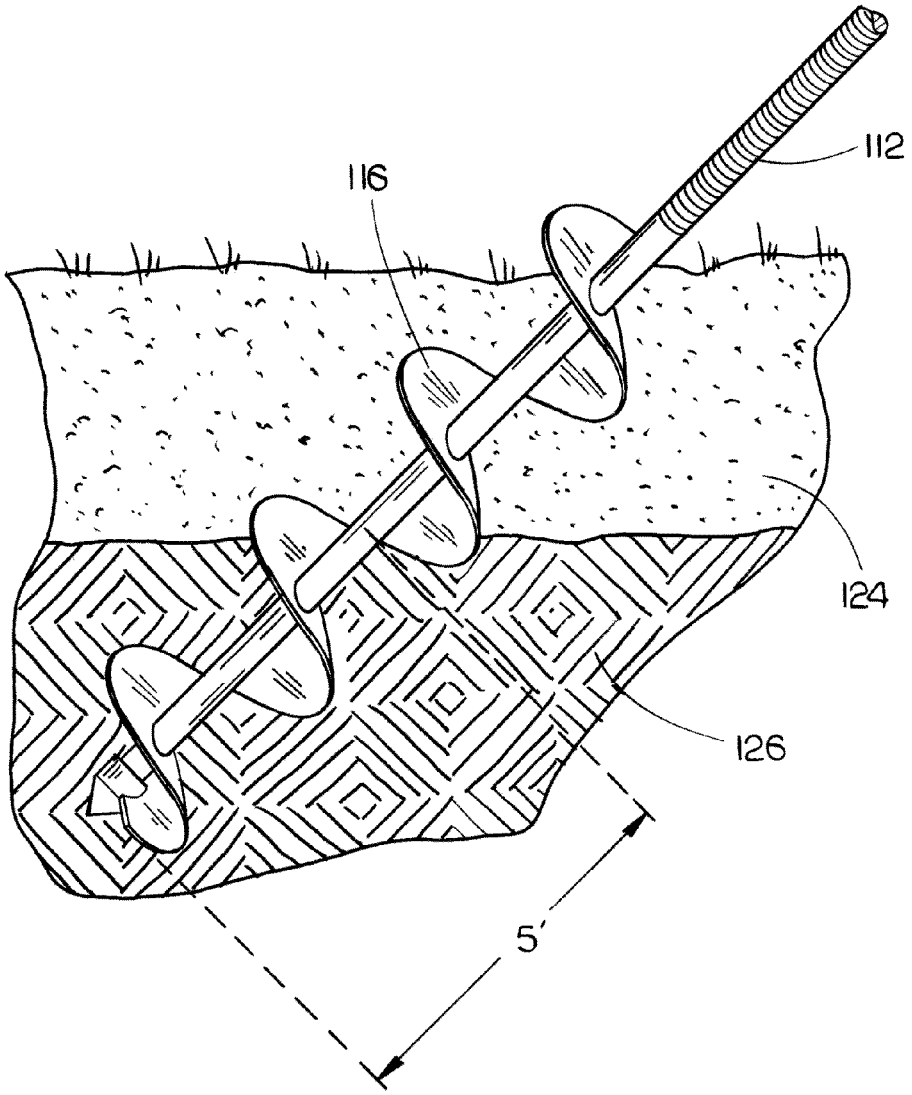
FIG. 5 is an illustration depicting the auger utilized by the anchoring unit.
Figure 6:
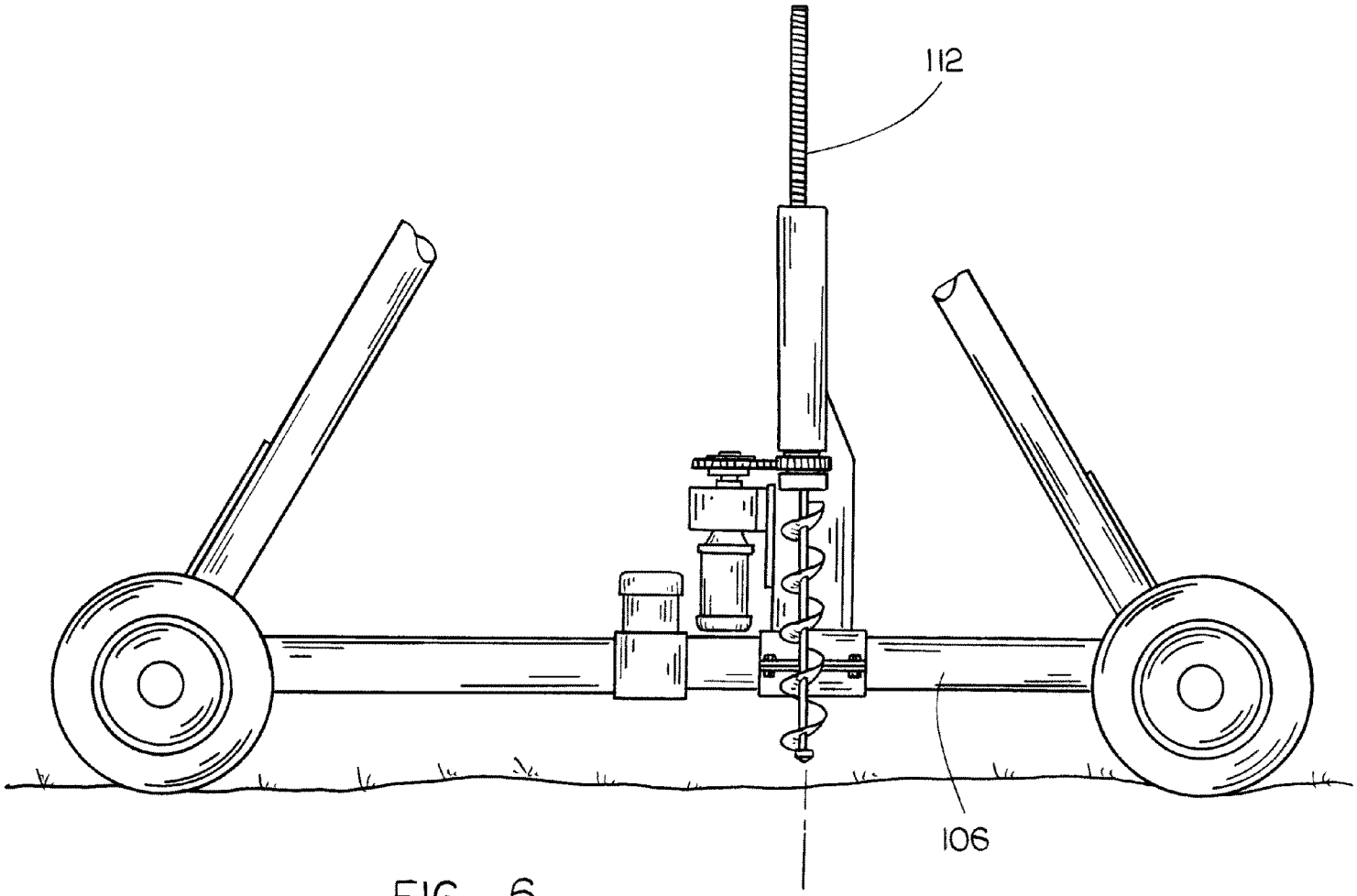
FIG. 6 is a side elevation view depicting an alternative anchoring unit positioned on a pivot axle.

As shown in FIGS. 1-5, the shaft 112 of a particular anchoring unit 102 may be offset at an angle relative to the axle 106 which the anchoring unit 102 is mounted on. In one embodiment, the shaft is placed at a 45° angle relative to the axle. In an alternative embodiment, the shaft is placed at a 135° angle relative to the axle. In still an alternative embodiment, the angle alternates between 45° and 135° for shafts mounted on adjacent axles, as shown in FIG. 1. It is contemplated, however, that the offset angles described above are exemplary and may vary without departing from the spirit and scope of the present disclosure. For example, the offset angles may range between 30-60° and 120-150°. In another example as depicted in FIG. 6, an anchoring unit 102 having a shaft 112 that is generally perpendicular to the axle 106 may also be utilized.

It is further contemplated that the anchoring unit 102 may include an optional sensor configured for measuring resistance encountered when drilling into the ground. The measured resistance may be utilized to help determining whether the auger has reached sufficient depth. For instance, as illustrated in FIG. 5, suppose the ground underneath the irrigation system includes a mud or sand layer 124 on top of a solid soil layer 126, the auger 116 may encounter more resistance as it drills into the solid soil layer 126. By detecting the changes in resistance, the anchoring unit 102 may determine whether ideal depth has been reached and/or whether to continue drilling. Ideally, drilling at least 5 feet of the auger into the solid soil layer 126 is preferable.

It is contemplated that an operator may override the decisions made by the anchoring unit 102. The operator may control one or more anchoring units 102 manually utilizing the control panel as previously described. The anchoring unit 102 may also be configured to drill until either the shaft 112 is turned all the way down or the anchor motor 108 can no longer turn the shaft 112 (e.g., auger stopped by a rock). It is understood that the different modes of operation and drilling depth requirements described above are exemplary, and they may vary without departing from the spirit and scope of the present disclosure.

It is further contemplated that the anchoring unit 102 is not required to be permanently secured to the axle 106. As previously described, the support base 104 may be configured as a clamp, a sleeve or the like to allow the anchoring unit 102 to be removable. For instance, the support base 104 may include a lockable, quick-release device that can be used to secured and lock the anchoring unit 102 to the axle 106 to prevent theft, and also allow the anchoring unit 102 to be released and removed from the axle 106 if the operator so desires. Alternatively, the anchoring unit 102 may be configured as a built-in component of the support frame for a tower.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An irrigation system, comprising:

a plurality of towers supporting an irrigation pipe, each tower of the plurality of towers including a pair of drive wheels and an axle extending between the pair of drive wheels; and

[a plurality of] *at least one* anchoring [units positioned on at least a subset of] *unit coupled to at least one tower of* the plurality of towers, [each] *the at least one* anchoring unit comprising:

a support base secured to the axle of a tower;

a threaded sleeve secured to the support base;

a shaft having a threaded portion and an anchor portion, at least a portion of the threaded portion of the shaft being enclosed within the threaded sleeve; and a motor secured to the support base, the motor configured for rotating the shaft in a first direction about a longitudinal axis of the shaft and moving the shaft along the longitudinal axis towards an anchoring position wherein at least a portion of the anchor portion of the shaft is drilled into a ground surface, the motor further configured for rotating the shaft in a second direction about the longitudinal axis of the shaft and moving the shaft along the longitudinal axis towards a disengaging position wherein the anchor portion of the shaft is lifted off of the ground surface.

2. The irrigation system of claim 1, wherein the support base forms a sleeve around the axle of the tower, the sleeve being at least approximately 36 inches long in a direction along the axle of the tower.

3. The irrigation system of claim 1, wherein the support base is removably secured to the axle of the tower.

4. The irrigation system of claim 1, wherein the threaded portion of the shaft is at least approximately 6 feet long and approximately 1 inch around.

5. The irrigation system of claim 1, wherein the anchor portion of the shaft includes an auger.

6. The irrigation system of claim 5, wherein a diameter of the auger ranges between approximately 10 inches and approximately 15 inches.

7. The irrigation system of claim 1, wherein each anchoring unit further comprises:

a shaft housing secured to the support base, the shaft housing configured for enclosing at least another portion of the threaded portion of the shaft.

8. The irrigation system of claim 1, wherein each anchoring unit further comprises:

a switch electronically coupled to the motor, the switch configured for preventing the shaft being rotated beyond a movable range.

9. The irrigation system of claim 1, wherein the longitudinal axis of the shaft is offset at an angle, and wherein the offset angle alternates for anchoring units positioned on adjacent towers.

10. The irrigation system of claim 1, wherein the longitudinal axis of the shaft is generally perpendicular to the axle of the tower.

*11. An anchoring apparatus for an irrigation system, the anchoring apparatus comprising:*

*a support base adapted to be removably coupled for securing to an axle of a support tower of the irrigation system;*

*a threaded sleeve secured to the support base;*

*a shaft having a threaded portion and an anchor portion, at least a portion of the threaded portion of the shaft being enclosed within the threaded sleeve; and*

*a motor secured to the support base, the motor configured for rotating the shaft in a first direction about a longitudinal axis of the shaft and moving the shaft along the longitudinal axis towards an anchoring position, the motor further configured for rotating the shaft in a second direction about the longitudinal axis of the shaft and moving the shaft along the longitudinal axis towards a disengaging position, wherein the support base defines a sleeve of at least approximately 36 inches long.*

*12. The anchoring apparatus of claim 11, wherein the threaded portion of the shaft is at least approximately 6 feet long and approximately 1 inch around.*

*13. The anchoring apparatus of claim 11, wherein the anchor portion of the shaft includes an auger.*

*14. The anchoring apparatus of claim 13, wherein a diameter of the auger ranges between approximately 10 inches and approximately 15 inches.*

*15. The anchoring apparatus of claim 11, wherein further comprising: a shaft housing secured to the support base, the shaft housing configured for enclosing at least another portion of the threaded portion of the shaft.*

*16. The anchoring apparatus of claim 11, further comprising: a switch electronically coupled to the motor, the switch configured for preventing the shaft being rotated beyond a movable range.*

*17. The anchoring apparatus of claim 11, wherein the longitudinal axis of the shaft is offset at an angle and is not perpendicular to the axle of the tower.*

*18. The anchoring apparatus of claim 11, wherein the longitudinal axis of the shaft is generally perpendicular to the axle of the tower.*

*19. An anchoring apparatus for an irrigation system, the anchoring apparatus comprising:*

*a support base adapted to be removably coupled for securing to an axle of a tower of the irrigation system, the support base defining a sleeve;*

*a threaded sleeve secured to the support base;*

*a shaft having a threaded portion and an anchor portion, at least a portion of the threaded portion of the shaft being enclosed within the threaded sleeve, the anchor portion of the shaft including an auger;*

*a motor secured to the support base, the motor configured for rotating the shaft in a first direction about a longitudinal axis of the shaft and moving the shaft along the longitudinal axis towards an anchoring position wherein at least a portion of the anchor portion of the shaft is drilled into a ground surface, the motor further configured for rotating the shaft in a second direction about the longitudinal axis of the shaft and moving the shaft along the longitudinal axis towards a disengaging position wherein the anchor portion of the shaft is lifted off of the ground surface; and*

*a switch electronically coupled to the motor, the switch configured for preventing the shaft being rotated beyond a movable range.*

*20. The anchoring apparatus of claim 19, wherein the support base further*

*includes a lockable, quick-release device configured for attachment to the axle of the irrigation system.*

* * * * *